United States Patent Office 3,088,929
Patented May 7, 1963

3,088,929
PROCESS OF CURING A CHLORINATED ETHYLENE HIGHER ALPHA OLEFIN COPOLYMER
Henry S. Makowski, Carteret, and William P. Cain, Roselle, N.J., assignors to Esso Research and Engineering Company, a corporation of Delaware
No Drawing. Filed June 2, 1958, Ser. No. 738,940
4 Claims. (Cl. 260—41)

The present invention relates to synthetic rubber and more particularly to chlorinated rubbery amorphous low pressure copolymers which can be cured to produce a synthetic rubber.

The low pressure polymerization and copolymerization of alpha olefins with catalyst systems made up of a partially reduced heavy transition metal halide and a reducing metal-containing compound to high density, high molecular weight, solid, relatively linear products is now well-known, see e.g. Belgian Patent 533,362, "Chemical and Engineering News," April 8, 1957, pages 12 through 16, and "Petroleum Refiner," December 1956, pages 191 through 196.

The preparation of synthetic rubber by curing chlorosulfonated polyethylene is also known to the art. However, chlorosulfonated polyethylene is completely saturated and contains both —$SO_2Cl$ and —$Cl$ groups attached to the hydrocarbon chains. Curing is effected through the —$SO_2Cl$ groups alone since most of the —$Cl$ groups are secondary halogen groups and thus have a low order of reactivity. Additionally, since the curing takes place through intermediate —$SO_3H$ groups by hydrolysis of the —$SO_2Cl$ groups, an acid such as abietic acid is a necessary part of the curing mixture. Chlorinated polyethylene is also known but contains few double bonds and has such a low order of reactivity for the chlorine atoms contained therein that their curing is quite difficult. No synthetic rubbers made by curing chlorinated polyethylene is known to the art. However, chlorinated polyethylene which is also unsaturated is known to the art, but this material is not rubbery, and while it can be cured, the products obtained are in the range of flexible leathery materials to hard plastics Additionally, certain chlorinated and chlorosulfonated polypropylenes are known to the art, but synthetic rubbers have not been successfully prepared therefrom.

It has now been found that chlorinated rubbery amorphous copolymers of ethylene and a higher alpha olefin can be cured to produce excellent synthetic rubbers having very good ozone resistance, mechanical properties, and resiliency.

The chlorinated copolymers of the invention are copolymers having an olefin content of 15 to 85 mol percent ethylene and 85 to 15 mol percent of a higher alpha olefin containing from 3 to 8 carbon atoms such as propylene, butene-1, heptene-1, and the like which contain from 1 to 30 wt. percent, preferably 2 to 15 wt. percent chlorine according to the Dietert Halogen Determination; have a crystallinity of less than 25%, usually less than 10% as determined by X-ray diffraction at room temperature; have softening points of less than 25° C. as determined on the Nalge melting point apparatus; tensile strengths determined by ASTM-D-412 of from 50 to 1000 p.s.i., preferably 50 to 500 p.s.i.; an apparent modulus of elasticity at —50° C. (ASTM-D-1043) of from 10,000 to 400,000 p.s.i., preferably from 50,000 to 200,000 p.s.i., and more preferably from 60,000 to 150,000 p.s.i.; and intrinsic viscosities in tetralin at 125° C. at a concentration of one gram per liter of from 0.4 to 3.5, preferably 0.9 to 2.5. The chlorinated copolymers also contain unsaturation as evidenced by iodine numbers of up to 30, infra-red spectra, and the fact that partial curing can be effected with the use of sulfur as the curing agent.

The chlorinated copolymers of the invention are prepared by chlorinating the corresponding unchlorinated copolymers with a chlorinating agent such as free chlorine at a temperature in the range of 25 to 150° C. and in an inert diluent such as carbon tetrachloride, chloroform, chlorobenzene, benzene, and the like. An advantageous process for preparing the chlorinated copolymers of the invention is described in copending application S/N 725,513 filed April 1, 1958, by W. P. Cain et al. In particular, chlorinated copolymers can be prepared according to the process of this copending application by polymerizing ethylene and a higher alpha olefin in contact with a low pressure polymerization catalyst in an inert diluent, preferably inactivating or removing the catalyst, and then treating the reaction mixture with a chlorinating agent at a temperature in the range of 40 to 150° C., preferably 70° to 120° C. The resulting chlorinated copolymer is then isolated from the chlorination reaction mixture.

It is to be noted that when parts or percentages are given in the specification and claims the parts or percentages are based on the weight of chlorinated copolymer, unless otherwise noted.

It has now been found that the chlorinated copolymers of the invention can be cured with a combination of curing agents to excellent synthetic rubbers. In particular, since they contain both unsaturation and relatively active chlorine groups, a combination of (1) a curing agent which cures through chlorine groups and (2) a curing agent which cures through unsaturation is used. Alternatively, dicumyl peroxide alone can be used. Also, combinations of dicumyl peroxide with either a curing agent which cures through chlorine groups or a curing agent which cures through unsaturation, or both can be used. For example, dicumyl peroxide plus sulfur or zinc oxide or both can be used. From 0.5 to 15, preferably from 2 to 8 parts of the chlorine group curing agent is used per 100 parts of chlorinated copolymer and from 0.5 to 10 parts, preferably from 1 to 7 parts of the unsaturation curing agent is used per 100 parts of chlorinated copolymer except when dimethylol phenol resins are used as the unsaturation curing agents. When these resins are used, they are used in the proportion of from 5 to 15 parts per 100 parts of chlorinated copolymer. Curing agents adapted to cure through chlorine groups include metal oxides, metal salts, metal powders, amines and polyamines. In general, the metal components of the metal salts, metal oxides and metal powders are chosen from groups IIA and IIB of the Periodic Table and copper, and iron. Particularly useful are the metal oxides, sulfides, nitrates, phosphates, sulfates, and organic acid salts of zinc, cadmium, manganese, iron and the lead. When amines and polyamines are used in the curing mixture, they are chosen from any diamine, triamine and higher polyamine having one or more of the following types of amino groups; (a) unsubstituted amino groups, (b) monosubstituted amino groups, (c) disubstituted amino groups, and (d) heterocyclic amines such as pyridine. The substituents on the mono- and di-substituted amino groups are one or more alkyl, aryl and heterocyclic groups.

The components of the curing mixture useful for curing through unsaturation include sulfur, resins such as dimethylol phenol resins and halogenated dimethylol phenol resins, and quinone dioxime and its derivatives. Either the chlorine group curing agent or the unsaturation curing agent can be used alone to effect partial curing, and this is within the broader scope of the invention, but the use of either type of curing agent is not to be considered as equivalent to the use of a combination of these curing agents since in general much poorer properties are obtained for the synthetic rubbers when only one type of curing agent is used.

When dicumyl peroxide is used as the curing agent, from 0.1 to 10 parts by weight, preferably 0.5 to 4.0 parts by weight per 100 part of chlorinated coplymer is employed.

Fillers such as carbon blacks, silica, mica and others of like nature can be added to the curing mixtures in amounts of from 5 to 150 parts, preferably about 50 parts. Any type of carbon black can be used, such as channel blacks, furnace blacks, acetylene blacks, lamp blacks, and the like. However, when dicumyl peroxide is used as a curing agent a neutral or basic carbon black is required such as the furnace blacks.

A small quantity, i.e. from 0.01 to 8%, preferably from 0.5 to 3% of a conventional rubber accelerator, for example tetramethylthiuram disulfide, benzothiazyl disulfide, 2-mercaptobenzothiazole, N-cyclohexylbenzothiazole-2-sulfenamide, selenium diethyl dithiocarbamate disulfide, and zinc butylxanthate can also be added with the filler. Mixtures of rubber accelerators can also be used. Additionally, antioxidants can be added when desired, such as for example secondary aromatic amines and phenols, e.g., phenyl-beta-naphthylamine, N,N'-di-beta-naphthyl - p - phenylene - diamines, aldol-alpha-naphthylamine, 2,2,4 - trimethyl-1,2 - dihydroquinoline, hydroquinone monobenzyl ether, and 2,2'-methylene-bis(4-methyl-6-tert.butylphenol). From 0.01 to 10%, preferably 0.1 to 2% of antioxidant can be used. When quinone dioxime or its derivatives are used, it is advantageous to include from 5 to 15 parts by weight of an oxidizing agent such as red lead in the curing mixture rather than an antioxidant. It should be noted that all antioxidants cannot be used with dicumyl peroxide. However, certain antioxidants such as hydroquinone monobenzyl ether that do not react rapidly with dicumyl peroxide at curing temperatures can be employed.

Oils derived from coal tar, pine tar and/or petroleum can be added to the curing mixture if desired and from 2 to 30 parts, preferably 5 to 15 parts by weight of oil per 100 parts of chlorinated polymer can be employed to serve as inexpensive fillers, softening agents or tackifying agents.

The reaction between the chlorinated copolymer and the curing agent is carried out by mixing the chlorinated copolymer and the curing agent in a rubber mill and heating the resulting mixture in a standard rubber press in the range of from 225° F. to 350° F., preferably 280° F. to 315° F. and more preferably about 310° F. until curing is effected. Fillers, rubber accelerators and antioxidants are added with the curing agent mixture as desired. The mixing is carried out in a rubber mill followed by heating the resulting mixture to reaction temperature in a standard rubber press or other conventional rubber curing equipment. The mixing can also be carried out in other rubber compounding equipment, such as Banbury mixers and kneaders.

The cured chlorinated copolymers of the invention have excellent mechanical properties, dynamic properties, and ozone resistance. They are useful wherever a good general purpose elastomer is required, such as in tires, hoses, gaskets and the like. Their use in tires is particularly advantageous since the synthetic rubber of the invention is tough and yet resilient and ozone resistant.

The invention will be understood more clearly from the following examples.

EXAMPLE I

A chlorinated amorphous ethylene-propylene copolymer was prepared by chlorinating a blend of several ethylene-propylene copolymers each of which was prepared by polymerizing an ethylene-propylene feed with an AlEt$_3$-TiCl$_4$ catalyst in n-heptane diluent. The chlorination was carried out with chlorine gas and a benzene diluent in the presence of ultra violet light. The properties of the chlorinated ethylene-propylene copolymer blend are given in Table I with the details of preparation. This chlorinated copolymer blend was then cured as shown in Table II using the following curing recipes.

Parts by weight
(A) Chlorinated ethylene-propylene copolymer____ 100
    Semi-reinforcing furnace black _____ 50
(B) Chlorinated ethylene-propylene copolymer____ 100
    Semi-reinforcing furnace black _____ 50
    Zinc oxide _____ 5
(C) Chlorinated ethylene-propylene copolymer____ 100
    Semi-reinforcing furnace black _____ 50
    Sulfur _____ 2
    Tetramethylthiuram disulfide _____ 1
    Benzothiazyl disulfide _____ 1
(D) Chlorinated ethylene-propylene copolymer____ 100
    Semi-reinforcing furnace black _____ 50
    Zinc oxide _____ 5
    Sulfur _____ 2
    Tetramethylthiuram disulfide _____ 1
    Benzothiazyl disulfide _____ 1

EXAMPLE II

A chlorinated ethylene-propylene copolymer was prepared according to the process of Example I and the details of preparation are given in Table I. This chlorinated ethylene-propylene copolymer was then cured according to recipe D above which includes both sulfur and zinc oxide with the results shown in Table II. Additionally, a sample of the unchlorinated copolymer was also cured with mixture D for comparison purposes. It can be seen from Table II that the unchlorinated ethylene-propylene copolymer cannot successfully be cured with a sulfur-zinc oxide recipe.

EXAMPLE III

A sample of the chlorinated copolymer of Example II was mixed with dicumyl peroxide according to the following recipe:

Parts of weight
Chlorinated ethylene-propylene copolymer_____ 100
Semi-reinforcing carbon black_____ 50
Dicumyl peroxide (40% on CaCO$_3$)_____ 4

The results obtained are shown in Table II.

Table I

| | Ex. I. | Ex. II |
|---|---|---|
| Unchlorinated polymer_____ | Ethylene-propylene copolymer | Ethylene-propylene copolymer |
| Polymerization catalyst_____ | AlEt$_3$/TiCl$_4$_____ | AlEt$_3$/TiCl$_4$. |
| Polymerization diluent_____ | n=heptane_____ | n=heptane_____ |
| Mole ratio of ethylene to propylene in feed. | | 1/1. |
| Inherent viscosity, η[1]_____ | 1.66_____ | 2.32. |
| Molecular weight[2]_____ | 82,000_____ | 140,000. |
| Iodine number, cg. of I$_2$/g. of polymer. | 1.60 | |
| Number of double bonds per carbon atoms.[3] | 0.06 | |
| Gel, percent_____ | 33.5_____ | 42.1 |
| Reaction: | | |
| Diluent_____ | Chlorobenzene___ | Benzene. |
| Volume, ml._____ | 1,000_____ | 900. |
| Polymer, g._____ | 70_____ | 65. |
| Approx. Cl$_2$ feed, cc./min____ | 310_____ | 310. |
| Temperature, °C_____ | 110_____ | 70. |
| Time, minutes_____ | 7[4]_____ | 15.[4] |
| Product: | | |
| Insoluble polymer, g_____ | 64_____ | 64. |
| Soluble oily polymer, g_____ | 9_____ | 11. |
| Total product, g_____ | 73_____ | 75. |
| Properties of insoluble product: | | |
| Inherent viscosity, η[1]_____ | 1.24_____ | 1.64.[5] |
| Molecular weight[2]_____ | 50,400_____ | 79,000. |
| Gel, percent_____ | 27.6_____ | 48.3 |
| Chlorine, weight percent_____ | 6.7_____ | 4.1. |
| Iodine number, cg. of I$_2$/g. of polymer. | 8 | 3.1 |
| Number of double bonds per 100 carbon atoms[3]_____ | 0.3_____ | 0.1. |

[1] In tetralin at 125° C. at a conc. of lg./l.
[2] I. Harris correlation for polyethylene, J. Pol. Sci., 8, 361 (1952).
[3] In the determination of the amount of unsaturation from the iodine number, it was assumed that 3 iodine atoms react for every double bond present in the polymer.
[4] Cl$_2$ gas was first passed into the reaction at the rate of 310 cc./ml. for 20-25 minutes at reaction temperature in the absence of U.V. light to saturate the solution with Cl$_2$.
[5] Incompletely soluble in tetralin at 125° C. at a concentration of lg./l.

Table II

| Conditions | Tensile strength, p.s.i. | Elongation percent |
|---|---|---|
| Example I: | | |
| A | 5'/308° F | 360 | 720 |
| | 15'/308° F | 420 | 540 |
| | 40'/308° F | 830 | 510 |
| B | 5'/308° F | 870 | 540 |
| | 15'/308° F | 1,990 | 400 |
| | 40'/308° F | 2,090 | 290 |
| | 60'/308° F | 2,170 | 280 |
| C | 5'/308° F | 280 | 820 |
| | 15'/308° F | 600 | 780 |
| | 60'/308° F | 1,810 | 480 |
| D | 5'/308° F | 2,000 | 560 |
| | 15'/308° F | 2,680 | 400 |
| | 40'/308° F | 2,650 | 300 |
| | 60'/308° F | 2,660 | 280 |
| Example II: | | | |
| D (unchlorinated copolymer) | 30'/309° F | (¹) | (¹) |
| | 60'/309° F | 520 | 330 |
| | 90'/309° F | (¹) | 350 |
| | 120'/309° F | 510 | 440 |
| D (chlorinated copolymer) | 35'/309° F | 2,340 | 380 |
| | 60'/309° F | 2,350 | 360 |
| | 90'/309° F | 2,220 | 370 |
| | 120'/309° F | 2,340 | 290 |
| Example III | 30'/310° F | 2,360 | 250 |
| | 60'/310° F | 2,080 | 290 |
| | 90'/310° F | 2,590 | 80 |
| | 120'/310° F | 2,480 | |

¹ Did not cure.

It can be seen from Table II that the cured chlorinated copolymers of the invention have good tensile strength and elongation properties. Also, the advantages of using curing mixture D which contains both sulfur and zinc oxide are apparent when compared with curing mixtures B and C in Table II which contain zinc oxide only and sulfur only respectively. Moreover, the effectiveness of curing with small quantities of dicumyl peroxide is apparent from the results obtained in Example III.

In addition to the above properties, the relative damping of the cured copolymers was measured on a Yerzley oscillograph and found to be in the range of 18 to 24%. This range is as good as is obtained with GR-S and is considerably better than that obtained with butyl rubber.

EXAMPLE IV

A chlorinated rubbery amorphous ethylene-propylene copolymer which contained 4.0 wt. percent chlorine was prepared by chlorinating an ethylene-propylene copolymer polymerized from a 50–50 volume percent ethylene-propylene feed in n-heptane using an $AlEt_3/TiCl_4$ catalyst. This chlorinated copolymer was divided into portions and each portion mixed with a different carbon black according to the following curing receipt.

| | Parts by weight |
|---|---|
| Chlorinated ethylene-propylene copolymer | 100 |
| Carbon black | 50 |
| Zinc oxide | 5 |
| Sulfur | 2 |
| Tetramethylthiuram disulfide | 1 |
| Benzothiazyl disulfide | 1 |

The following carbon blacks were used: Super abrasion furnace, high abrasion furnace, fast extruding furnace, semi-reinforcing furnace, medium thermal, and fine thermal. These curing mixtures were cured at 310° F. for 30 minutes. The tensile strengths of the synthetic rubbers produced varied from 1640 p.s.i. to 2930 p.s.i. with elongations of from 325 to 525%. It can be seen from this example that a large variety of carbon blacks can be employed.

EXAMPLE V

A chlorinated ethylene-propylene copolymer which contained 5.9 wt. percent chlorine and which was prepared by chlorinating an ethylene-propylene copolymer polymerized from a 50–50 volume percent ethylene-propylene feed in chlorobenzene using an $AlEt_3/TiCl_3 \cdot 0.2 AlCl_3$ catalyst was divided into portions and cured according to the following recipe:

| | Parts by weight |
|---|---|
| Chlorinated ethylene-propylene copolymer | 100 |
| Zinc oxide | 5 |
| Stearic acid | 1 |
| Sulfur | 2 |
| Tetramethylthiuram disulfide | 1 |
| Benzothiazyl disulfide | 1 |
| Semi-reinforcing furnace black | x | where x is either 25, 50, 75 or 100 parts of semi-reinforcing furnace black. These mixtures were cured at 308° F. for 45 minutes. Tensile strengths of from 2510 to 2980 were obtained with elongations of from 180 to 540%. A curing mixture was also prepared according to the above recipe except in the absence of any carbon black. This mixture was also cured at 308° F. for 45 minutes. The tensile strength of this synthetic rubber was 1070 p.s.i with an elongation of 470%. It can be seen from this example that different quantities of fillers such as carbon black are effective for improving the properties of the synthetic rubbers of the invention.

EXAMPLE VI

Samples of natural rubber, GR-S 1500, butyl 217, and a chlorinated ethylene-propylene copolymer prepared from a 50–50 volume percent ethylene-propylene feed and chlorinated to a chlorine content of 4.8% were cured according to the following recipes with the curing conditions and mixtures most suitable for each.

| | Parts by weight |
|---|---|
| (F) Natural rubber | 100 |
| Semi-reinforcing furnace black | 50 |
| Zinc oxide | 5 |
| Sulfur | 3 |
| Stearic acid | 1 |
| 2-mercaptobenzothiazole | 1 |
| Phenyl betanaphthylamine | 1 |
| (G) GR-S 1500 | 100 |
| Semi-reinforcing furnace black | 50 |
| Zinc oxide | 5 |
| Sulfur | 2 |
| Stearic acid | 2 |
| Benzothiazyl disulfide | 1.5 |
| Phenyl betanaphthylamine | 1 |
| Copper dimethyl dithiocarbamate | 0.1 |
| (H) Butyl rubber 217 | 100 |
| Semi-reinforcing furnace black | 50 |
| Zinc oxide | 5 |
| Sulfur | 2 |
| Tetramethylthiuram disulfide | 1 |
| Benzothiazyl disulfide | 1 |
| (I) Chlorinated ethylene-propylene copolymer | 100 |
| Semi-reinforcing furnace black | 50 |
| Zinc oxide | 5 |
| Sulfur | 2 |
| Tetramethylthiuram disulfide | 1 |
| Benzothiazyl disulfide | 1 |

The above curing mixtures were cured at the times and temperatures shown in Table III and thereafter were stretched to 50% extension and subjected to a concentration of 0.2% ozone. The time for each synthetic rubber to break was recorded and is given in Table III.

Table III

| Curing mixture | Curing conditions | Time to break, min. |
|---|---|---|
| F (natural rubber) | 20'/287° F | 6 |
| G (GR-S 1500) | 30'/287° F | 6 |
| H (butyl rubber 217) | 40'/308° F | 225 |
| I (chlorinated ethylene-propylene copolymer) | 40'/308° F | 870 |

It can be seen from Table III that the cured chlorinated ethylene-propylene copolymer of the invention exhibits a markedly greater ozone resistance than the other rubbers employed in the test.

EXAMPLE VII

The chlorinated ethylene-propylene copolymer of Example IV was cured for 30 minutes at 308° F. according to the following curing recipe:

| | Parts by weight |
|---|---|
| Chlorinated ethylene-propylene copolymer | 100 |
| Semi-reinforcing carbon black | 50 |
| Zinc oxide | 5 |
| Sulfur | 2 |
| Tetramethylthiuram disulfide | 1 |
| Benzothiazyl disulfide | 1 |
| Stearic acid | 1 |

Samples of butyl rubber 217 and natural rubber were cured according to the following recipes:

| | Parts by weight |
|---|---|
| Butyl rubber 217 | 100 |
| Medium processing channel black | 50 |
| Zinc oxide | 5 |
| Sulfur | 2 |
| Tetramethylthiuram disulfide | 1 |
| Benzothiazyl disulfide | 1 |
| Stearic acid | 0.5 |
| Natural rubber | 100 |
| Medium processing channel black | 50 |
| Zinc oxide | 3 |
| Sulfur | 3 |
| 2-mercaptobenzothiazole | 1 |
| Reogen | 2 |
| Stearic acid | 3 |

The curing conditions and the resilience of the above cured rubbers at different temperatures are given in Table IV. The resilience was measured on the Goodyear-Healy Rebound instrument according to ASTM D1054–55.

*Table IV*

| | Chlorinated copolymer | Butyl rubber | Natural rubber |
|---|---|---|---|
| Curing conditions | 30′ at 308° F | 50′ at 307° F | 55′ at 274° F. |
| Rebound, percent: | | | |
| 0° C | 45 | | 57. |
| 23° C | 54 | | |
| 26° C | | 29 | 64. |
| 35° C | | 36 | |
| 43° C | 56 | | |
| 50° C | | 46 | |
| 70° C | | 56 | 71. |
| 74° C | 58 | | |
| 99° C | | 64 | 76. |
| 100° C | 61 | | |

It can be seen from the above table that the cured chlorinated copolymer of the invention has much better resilience than butyl rubber below 75° C.

The above examples are given for illustration purposes only and are not intended to limit the invention. Variations in the invention can be made without departing from the scope and spirit of the invention.

What is claimed is:
1. The process for forming a synthetic rubber comprising the steps of:
   (1) mixing (*a*) a chlorinated copolymer having an olefin content consisting essentially of 15 to 85 mol percent ethylene and 85 to 15 mol percent of an α-olefin containing from 3 to 8 carbon atoms, and having a chlorine content of from 1 to 30 weight percent, said copolymer having been chlorinated at a temperature of 70°–120° C.; and (*b*) a curing agent selected from the class consisting of dicumyl peroxide; metal oxides, metal salts and metal powders, the metal components of which are groups IIA and IIB metals, copper and iron; heterocyclic amines; sulfur; quinone dioxime and its derivatives; mixtures thereof; and
   (2) heating the resulting mixture to curing temperatures to cure said chlorinated copolymer.
2. The process of claim 1 wherein the curing mixture additionally includes tetramethylthiuram disulfide and benzothiazyl disulfide as accelerators.
3. The process of claim 2 wherein the curing mixture comprises zinc oxide, sulfur, tetramethylthiuram disulfide and benzothiazyl disulfide.
4. The process of claim 3 wherein the curing mixture additionally includes carbon black.

References Cited in the file of this patent

UNITED STATES PATENTS

| 2,200,429 | Perrin et al. | May 14, 1940 |
| 2,405,971 | McAlevy | Aug. 20, 1946 |
| 2,691,647 | Field et al. | Oct. 12, 1954 |
| 2,850,490 | Canterino et al. | Sept. 2, 1958 |
| 2,920,064 | Baptist et al. | Jan. 5, 1960 |
| 2,958,672 | Goldberg | Nov. 1, 1960 |

FOREIGN PATENTS

| 478,513 | Canada | Nov. 13, 1951 |